United States Patent
Ickler et al.

(10) Patent No.: US 8,561,520 B2
(45) Date of Patent: Oct. 22, 2013

(54) BRAKE SERVO

(75) Inventors: Volker Ickler, Kirchheim (DE); Michael Kollers, Eschborn (DE); Horst Kraemer, Ginsheim-Gustavsburg (DE); Stephan Krebs, Eschborn (DE); Harald König, Ober-Mörlen (DE); Ralf Jakobi, Flörsheim (DE); Thorsten Neu, Runkel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 761 days.

(21) Appl. No.: 12/743,430

(22) PCT Filed: Nov. 20, 2008

(86) PCT No.: PCT/EP2008/065888
§ 371 (c)(1),
(2), (4) Date: Jul. 22, 2010

(87) PCT Pub. No.: WO2009/065883
PCT Pub. Date: May 28, 2009

(65) Prior Publication Data
US 2010/0288119 A1    Nov. 18, 2010

(30) Foreign Application Priority Data

Nov. 22, 2007 (DE) .......................... 10 2007 056 523
Aug. 8, 2008 (DE) .......................... 10 2008 037 048

(51) Int. Cl.
*B60T 13/57* (2006.01)
*B60T 13/72* (2006.01)

(52) U.S. Cl.
USPC .......................................... 91/367; 91/376 R

(58) Field of Classification Search
USPC .................................................. 91/367, 376 R
See application file for complete search history.

(56) References Cited

U.S. PATENT DOCUMENTS

| | | | |
|---|---|---|---|
| 5,355,771 A | 10/1994 | Watanabe | |
| 5,611,258 A * | 3/1997 | Matuo et al. | 91/376 R |
| 6,227,099 B1 * | 5/2001 | Kahrs et al. | 91/367 |
| 7,950,320 B2 * | 5/2011 | Kramer et al. | 91/367 |
| 7,954,909 B2 * | 6/2011 | Yamashita | 91/369.1 |
| 2008/0245221 A1 | 10/2008 | Kramer et al. | |

FOREIGN PATENT DOCUMENTS

FR    2824033 A1 * 10/2002
WO   WO 2006/005742    1/2006

OTHER PUBLICATIONS

International Search Report for PCT/EP2008/065888 issued Apr. 16, 2010.
German Search Report for DE 10 2008 037 048.7 dated Mar. 10, 2009.

* cited by examiner

*Primary Examiner* — Thomas E Lazo
(74) *Attorney, Agent, or Firm* — RatnerPrestia

(57) ABSTRACT

A brake servo whose valve piston has a concentric sealing seat which projects axially beyond a second sealing seat, with the concentric sealing seat having at least one recess for throttling the air volume flow. The controllability and also the noise characteristics of the brake servo can be improved in this way.

12 Claims, 4 Drawing Sheets

A - A

BRAKE SERVO

CROSS REFERENCE TO RELATED APPLICATIONS

This application is the U.S. national phase application of PCT International Application No. PCT/EP2008/065888, filed Nov. 20, 2008, which claims priority to German Patent Application No. DE 10 2007 056 523.4, filed Nov. 22, 2007, and German Patent Application No. 10 2008 037 048.7, filed Aug. 8, 2008, the contents of such applications being incorporated herein by reference.

FIELD OF THE INVENTION

The invention relates to a brake servo for motor vehicles, having a servo housing, the interior space of which is divided by a movable wall into a vacuum chamber and a working chamber, and also having a control housing which bears the movable wall and in which is arranged a control valve which controls a pneumatic pressure difference acting on the movable wall and which can be actuated both by an actuating rod via a valve piston and also, independently of the actuating rod, by an electromagnet and which is composed of three sealing seats arranged concentrically with respect to one another and of a valve body which interacts with the sealing seats, with the first sealing seat being formed in the control housing and with the second sealing seat being formed on the valve piston, while the third sealing seat is formed on a sleeve which interacts with the electromagnet, and also having an annular element which is arranged so as to be movable relative to the third sealing seat and which is arranged radially within the sleeve.

BACKGROUND OF THE INVENTION

A brake servo of said type is known from WO 2006/005742 A1, which is incorporated by reference. It has however been found that the already-known brake servo has disadvantages with regard to the response and noise characteristics in the event of the electromagnet being supplied with a low current and at the small opening travel of the valve piston thereby initiated.

SUMMARY OF THE INVENTION

It is therefore an object of the present invention to further develop a brake servo of the type mentioned in the introduction in such a way that the abovementioned disadvantages are avoided.

To solve the stated problem, it is therefore provided that the valve piston has a further concentric sealing seat which projects axially beyond the second sealing seat in partial regions.

Those partial regions which project beyond the second sealing seat in the axial direction serve to provide throttling of the air flow at small opening travels of the valve piston, as a result of which the controllability and the noise characteristics of the brake servo when the latter is supplied with low electrical currents are improved.

BRIEF DESCRIPTION OF THE DRAWINGS

The invention will be explained in more detail in the following description on the basis of a plurality of drawings, in which.

DETAILED DESCRIPTION OF THE INVENTION

Figure 1:
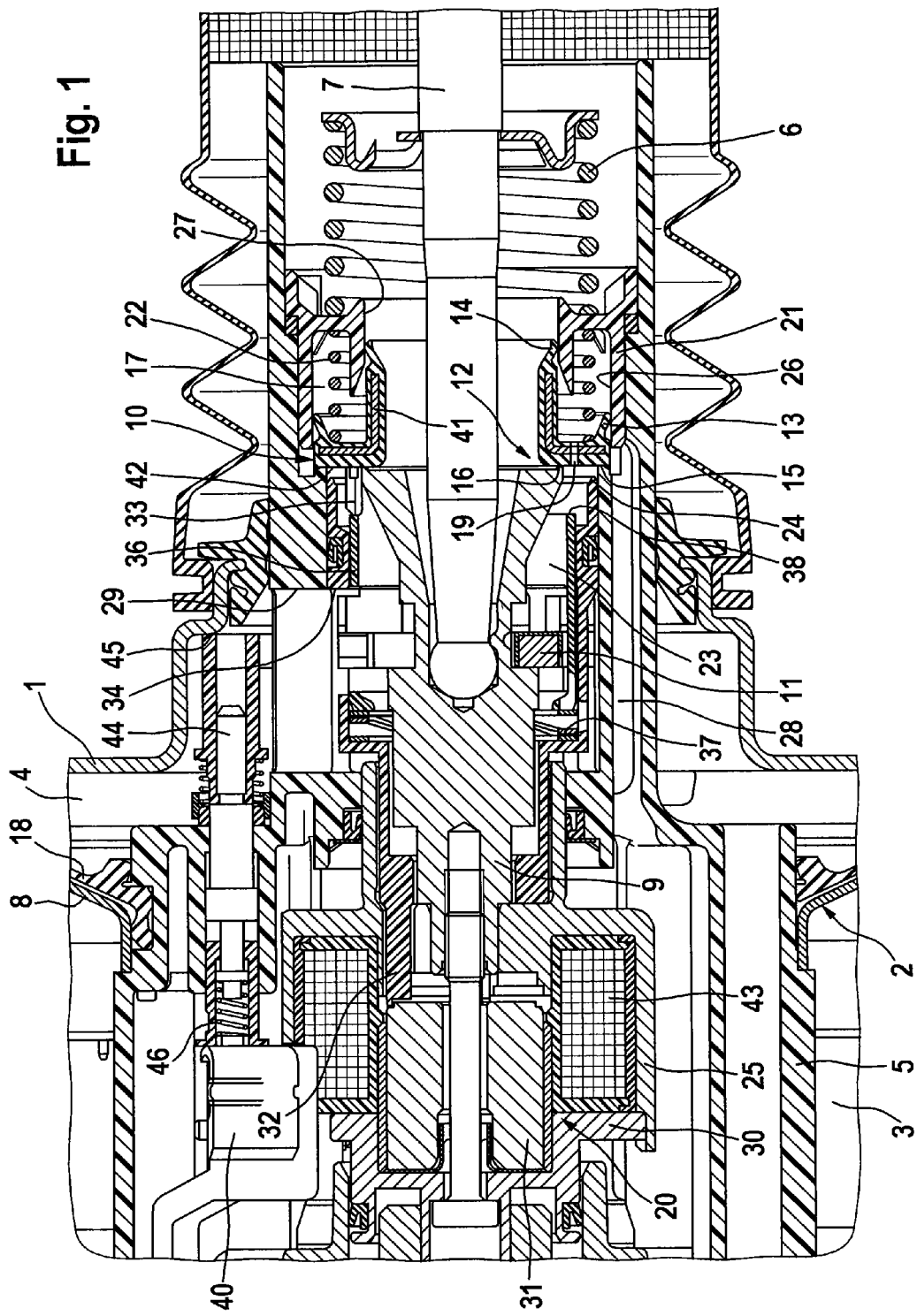
FIG. 1 shows a detail of a known brake servo in longitudinal section.

For better understanding of the invention, the basic design of a brake servo in longitudinal section, such as is known from WO 2006/005742 A1, will firstly be explained below on the basis of FIG. 1, before a detailed description is given of the features of the invention shown in FIGS. 2-8 which contribute to the improvement of the proposed brake servo. FIG. 1 shows the servo housing 1 of the known brake servo in sections, which servo housing 1 is divided by an axially movable wall 2 into a vacuum chamber 3 and a working chamber 4. The axially movable wall 2 is composed of a diaphragm plate 8, which is deep-drawn from sheet metal, and a flexible diaphragm 18 which bears against said diaphragm plate 8 and which, in a manner which is not illustrated, forms a rolling diaphragm as a seal between the outer circumference of the diaphragm plate 8 and the servo housing 1.

A control valve 12 which can be actuated by an actuating rod 7 is accommodated in a control housing 5 which is guided in a sealed fashion in the servo housing 1 and which bears the movable wall 2, which control valve 12 is composed of a first sealing seat 15 formed on the control housing 5, of a second sealing seat 16 formed on the valve piston 9 which is connected to the actuating rod 7, and of a valve body 10 which interacts with the two sealing seats 15,16 and which is guided in a guide part 21 arranged immovably in a sealed fashion in the control housing 5 and which is L-shaped in cross section and which is pressed against the valve seats 15, 16 by means of a valve spring 22 which is supported on the guide part 21. Here, the valve body 10 has two coaxial sealing lips 13, 14 of different length which interact with two coaxial cylindrical guide surfaces 26, 27 of the guide part 21. The guide part 21 delimits a pneumatic chamber 17 which can be acted on, via axial passages 19 formed in the valve body 10, with the pneumatic pressure prevailing in the working chamber 4. The working chamber 4 can be connected to the vacuum chamber 3 via a duct 28 which runs laterally in the control housing 5.

A restoring spring which is not illustrated in the drawing and which is supported against a vacuum-side end wall (likewise not shown) of the servo housing 1 holds the movable wall 2 in the initial position shown. Furthermore, a second pressure spring or piston rod return spring 6 is provided which is supported at one side indirectly on the actuating rod 7 and at the other side on the guide part 21 and the force of which serves to provide a preload of the valve piston 9 or of the sealing seat 16 thereof relative to the valve body 10.

Finally, to be able to connect the working chamber 4 to the atmosphere during the actuation of the control valve 12, an approximately radially running duct 29 is formed in the control housing 5. The returning movement of the valve piston 9 at the end of a braking process is limited here by a transverse member 11 which, in the release position of the brake servo shown in the drawing, bears against a stop formed in the servo housing 1.

As can also be seen from the drawing, the valve body 10, which is stiffened by means of a metallic stiffening profile 41, has an annular sealing surface 42 which interacts with the two sealing seats 15,16 and which is provided with a plurality of axial passages 19. The flow ducts (not shown in any more detail) which are formed by the passages 19 and openings in the sealing surface 42 connect the pneumatic chamber 17 to an annular chamber which is delimited by the sealing seats 15,16 and which is connected to the abovementioned pneumatic duct 29, such that the pneumatic chamber 17 which is formed on that side of the valve body 10 which faces away from the sealing surface 42 is permanently connected to the working chamber 4 and a pneumatic pressure equalization takes place on the valve body 10.

The described arrangement accordingly permits a reduction in the difference between the response force of the brake servo and the restoring force acting on the valve piston 9, in the sense that, for a constant response force, an increase in the restoring force is possible, or for a constant restoring force, a reduction in the response force is possible, as a result of which an improvement in the hysteresis of the brake servo is obtained.

To initiate an external actuation, which is independent of the actuating rod 7, of the brake servo according to aspects of the invention, a third sealing seat 24 is provided radially between the first sealing seat 15 and the second sealing seat 16, which third sealing seat 24 can be actuated by means of an electromagnet 20 which is arranged preferably in a housing 25 fixedly connected to the valve piston 9 and which can accordingly be moved together with the valve piston 9 in the control housing 5. The electromagnet 20 is composed of a coil 43, which is arranged within the housing 25, and of an axially movably arranged cylindrical armature 31 which is guided partially in a closure part 30 which closes off the housing 25, on which armature 31 is supported a sleeve 32, in that region of which which faces towards the valve body 10 is formed the mentioned third sealing seat 24. In the initial position of the armature 31 illustrated in the drawing, the third sealing seat 24 is arranged axially offset in relation to the second sealing seat 16 formed on the valve piston 9, such that a gap is present between the third sealing seat 24 and the sealing surface 42 of the valve body 10. Furthermore, an annular element 36 is provided which is preferably guided radially within the sleeve 32 and which is supported on the sleeve 32 with the interposition of an elastic or compressible element 37, in such a way that a relative movement between said annular element 36 and the sleeve 32 is possible. The elastic or compressible element 37 is formed in the illustrated example by a corrugated spring and enables controllable activation of the annular element 36. A partial region, which faces towards the valve body 10, of the annular element 36 is divided into partial regions 33 by radial apertures 38.

To be able to connect a pneumatic chamber 23, which is delimited by the sleeve 32 and the annular element 36 in the control housing 5, to the working chamber 4, an aperture 34 is provided in both of said parts. Here, the arrangement of the abovementioned corrugated spring 37 in the installed state is preferably such that said corrugated spring 37 is situated behind the aperture 34 or behind the abovementioned transverse element 11 as viewed in the actuating direction of the control valve 12. In this way, the corrugated spring 37 is arranged outside the direct air flow region, as a result of which positive effects on the flow cross sections with regard to dynamics and noise characteristics are obtained. Furthermore, the annular element 36, in its region facing towards the corrugated spring 37, has latching elements or projections (not shown) which interact with recesses 39 formed in the sleeve 32 in such a way that the annular element 36 forms a releasable assembly with the sleeve 32.

Finally, in the embodiment of the brake servo shown in the drawing, electric switching means 40, 44 are provided which are important in particular during braking processes in which, in addition to the driver actuation, the electromagnet 20 is activated in order to effect a full braking operation independently of the driver demand (so-called brake assist function). Here, it is of particular significance that the switching means 40,44 are actuated during every braking operation. It must at the same time be ensured that the electromagnet 20 is reliably deactivated after the end of the external-force-assisted braking process. Here, the switching means shown are composed of a microswitch 40, which is fastened preferably to the valve piston 9 or to the housing 25 of the electromagnet 20 and which has two switching positions, and of an actuating element 44 which actuates the microswitch 40 by means of a translatory movement and which is guided in a sealed fashion in a bore provided in the control housing 5 and which interacts with a stop 45 which is fixed with respect to the servo housing, which stop 45 bears the reference symbol 45 and may be formed for example by a radial collar of the rear servo housing half. Arranged between the actuating element 44 and the control housing 5 is a pressure spring 46, such that that end of the actuating element 44 which faces away from the microswitch 40 bears with a preload against the stop 45.

The individual actuating phases of the control valve 12 during the external actuation thereof by the electromagnet 20 are fundamentally known and are therefore described only briefly.

In the rest or readiness position of the control valve 12 shown in FIG. 1, the valve body 10 bears both against the first sealing seat 15 and also against the second sealing seat 16, such that the two chambers 3,4 of the brake servo are separated from one another and the connection of the working chamber 4 to the atmosphere is blocked. The third sealing seat 24 is situated at a distance from the sealing surface 42 of the valve body 10, and the annular element 36 bears with its partial regions 33 against the sealing surface 42.

To set a pressure build-up position independently of the driver, the electromagnet 20 is supplied with current, such that both the third sealing seat 24 and also the annular element 36 firstly come into contact with the valve body 10 and subsequently the valve body 10 is moved to the right in the drawing counter to the force of the valve spring 22, such that a gap is generated between the second sealing seat 16 and the valve body 10 and the working chamber 4 is aerated. Here, the first sealing seat 15 is replaced in functional terms by the third sealing seat 24.

In a pressure-holding phase, the second sealing seat 16 and the third sealing seat 24 are closed, such that no changes in the pneumatic pressure prevailing in the servo housing 1 can occur.

In a controlled pressure dissipation phase, the second sealing seat 16 remains closed and the third sealing seat 24 is raised up from the sealing surface 42, while the annular element 36 bears with its partial regions 33 against the sealing surface 42 as a result of the preload of the elastic element 37, such that, via recesses (not shown) of at least a proportion of the partial regions 33, a dosed suction of the atmosphere from the working chamber 4 and therefore a dissipation of the pneumatic pressure set in the servo housing 1 of the pneumatic brake servo take place.

FIGS. 2 to 8 show features which are essential to the invention and which, in combination with the features of the brake servo presented in FIG. 1, lead to a new, improved brake servo. The elementary function and the basic design of the improved brake servo are otherwise identical to those of the brake servo described above.

The following description of the details disclosed in FIGS. 2-8 will therefore discuss only the differences which are essential to the invention.

Figure 2:
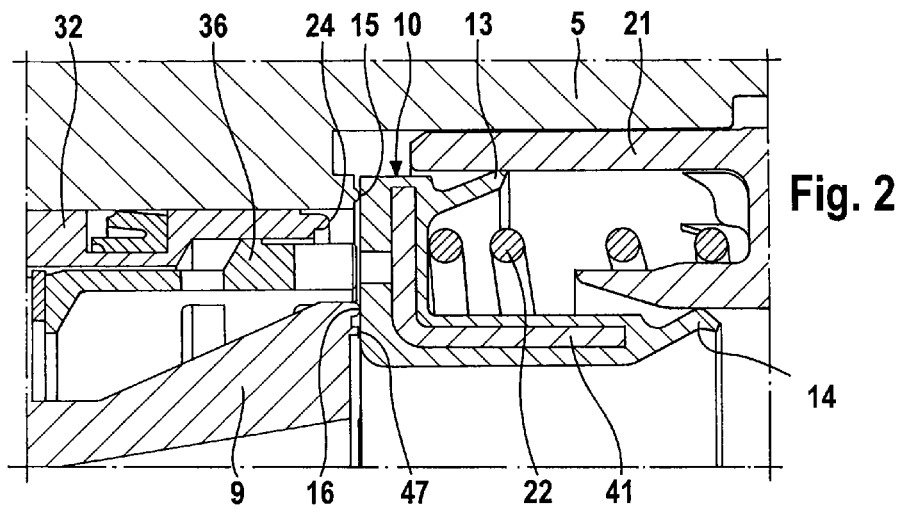
FIG. 2 shows, taking FIG. 1 as a starting point, a detail of the pneumatic control group, improved by features essential to the invention, in longitudinal section in the inactive readiness position, FIGS. 3a,b show a detail of the pneumatic control group according to FIG. 2 in longitudinal section, when a low current is supplied.

Here, FIG. 2 shows a detail of a pneumatic control group of an improved brake servo according to aspects of the invention in longitudinal section in the inactive readiness position, in which the two sealing seats 15 and 16 bear against the sealing surface 42 of the valve body 10. According to aspects of the invention, the valve piston 9 has a further, lower sealing seat 47 which is formed concentrically with respect to the other sealing seats 15,16,24 on an inner side of the second sealing seat 16. In the readiness position, the further sealing seat 47 also bears against the valve body 10.

Figure 3A:
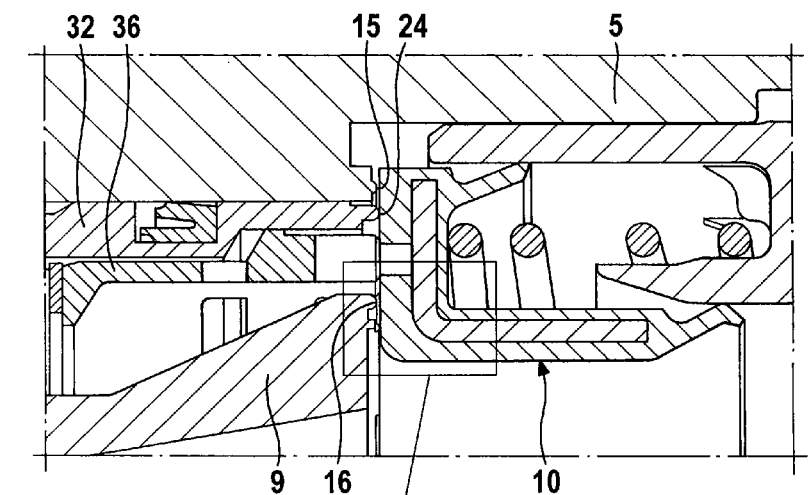
Figure 3B:
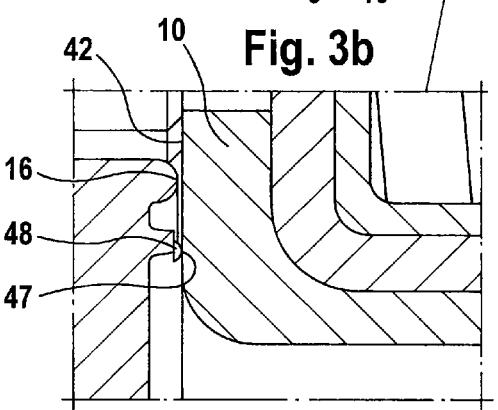

FIGS. 3a and 3b illustrate the pneumatic control group according to FIG. 2 in longitudinal section when the electromagnet 20 is supplied with a low current in order to set a pressure build-up position independently of the driver, as has already basically been discussed with regard to FIG. 1. Here, the third sealing seat 24 comes into contact with the valve body 10, such that the valve body 10 is moved to the right in the drawing, counter to the force of the valve spring 22. A gap is generated between the second sealing seat 16 and the valve body 10, and the working chamber 4 is aerated. Here, the first sealing seat 15 is replaced in functional terms by the third sealing seat 24.

It can be seen in particular from FIG. 3b, which illustrates the region of the sealing seats 16 and 47 on an enlarged scale, that the further sealing seat 47 projects axially beyond the second sealing seat 16, such that at a small opening travel of the valve piston 9, the sealing seat 47 still bears against the sealing surface 42 when the second sealing seat 16 has already lifted up from said sealing surface 42. The sealing seat 47 has at least one recess 48 but preferably a plurality of recesses 48 distributed uniformly on the circumference, which recesses 48, in the position of the brake servo which is shown, permit a throttled air flow in the direction of the working chamber 4, as a result of which the controllability and the noise characteristics of the brake servo when a low current is supplied are optimized.

Figure 4:
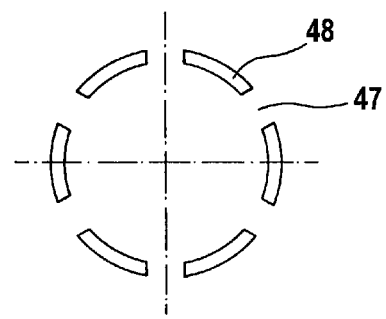
FIG. 4 shows a schematic illustration of the further sealing seat on the valve piston of the control group according to FIGS. 2, 3a, 3b, FIGS. 5a,b show a perspective illustration of the valve piston for the control group known from FIGS. 2, 3a, 3b.

FIG. 4 shows a very highly schematized illustration of the further sealing seat 47 according to aspects of the invention with a uniform distribution of the recesses 48 over the entire circumference.

Figures 5A, 5B, 6:
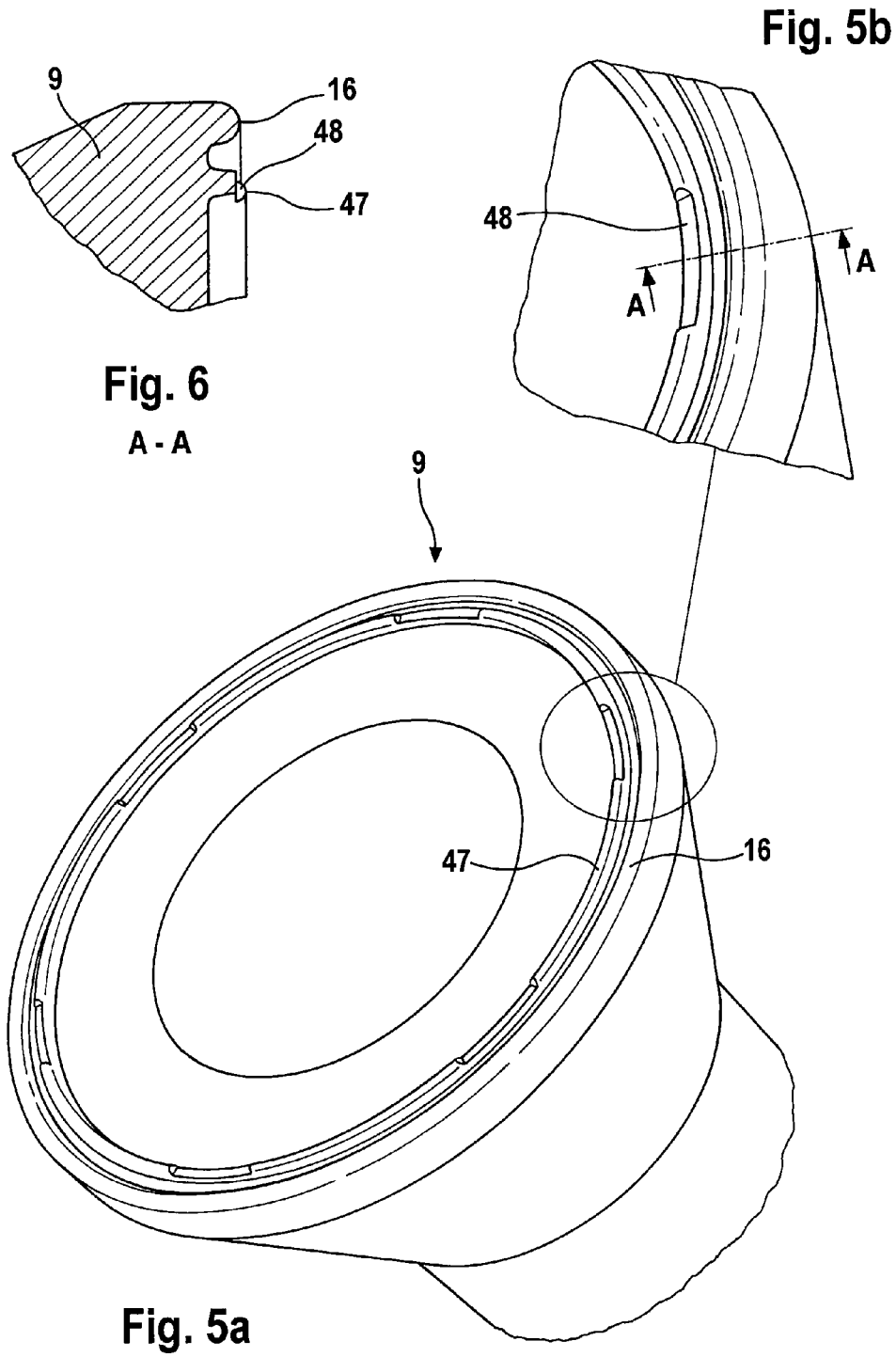
FIG. 6 shows a section through the plane A-A of the valve piston according to FIG. 5b.

FIGS. 5a and 5b show a perspective illustration of the valve piston 9 of the control group shown in longitudinal section in FIGS. 2, 3, wherein in addition, FIG. 6 shows a section through the plane A-A of the valve piston 9 according to FIG. 5b. It can be seen from said section that the sealing seat 47 projects beyond the second sealing seat 16 in the axial direction, whereas the second sealing seat 16 however projects a short distance beyond the recesses 48 in order to enable the desired sealing function.

Figure 7:
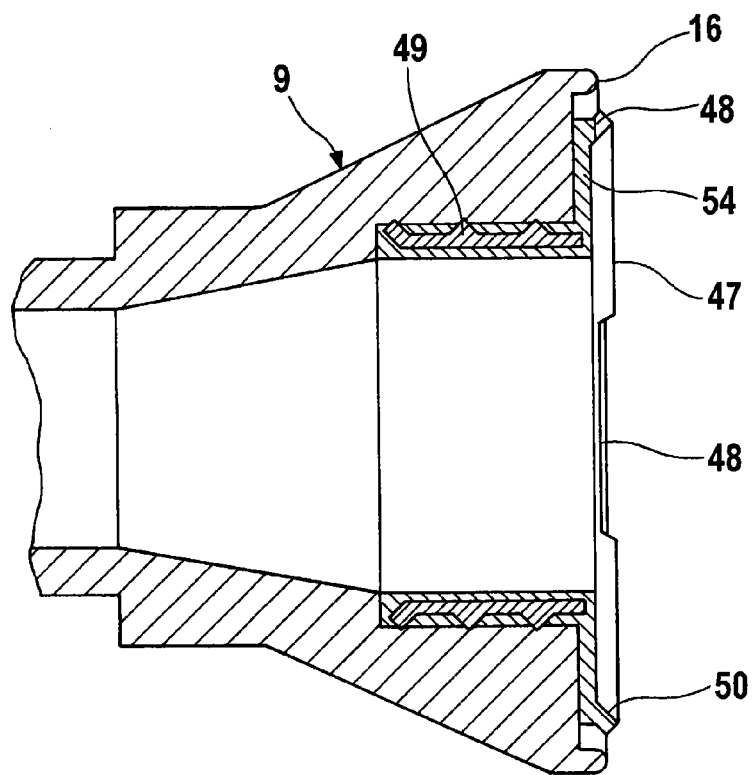
FIG. 7 shows a modification of the valve piston known from FIGS. 5a, 5b, 6 in longitudinal section, having an elastomer throttle element which is pressed, in conjunction with an insert part, into the valve piston.

Furthermore, FIG. 7 shows a modification of the further concentric sealing seat 47, known from FIGS. 5a, 5b, 6, on the valve piston 9 in longitudinal section, in which the further sealing seat 47 is formed by an elastomer throttle element 54 with a circularly discontinuous sealing lip 50 which, as an element produced preferably by extrusion coating, is formed on a sleeve shaped insert part 49 manufactured preferably from steel, which insert part 49 is pressed into the valve piston 9. In contrast to the previous exemplary embodiments, therefore, the sealing seat 47 is no longer a direct constituent part of the valve piston 9 but rather is a constituent part of the throttle element 54 which is inserted into the valve piston 9. In the brake release position, the sealing lip 50 pauses within the valve piston 9, while the sealing lip 50 opens up a defined throttled air flow cross section only in the pressure build-up position. With regard to the second sealing seat 16, the explanations given above with regard to the previous exemplary embodiments apply unchanged.

Figure 8:
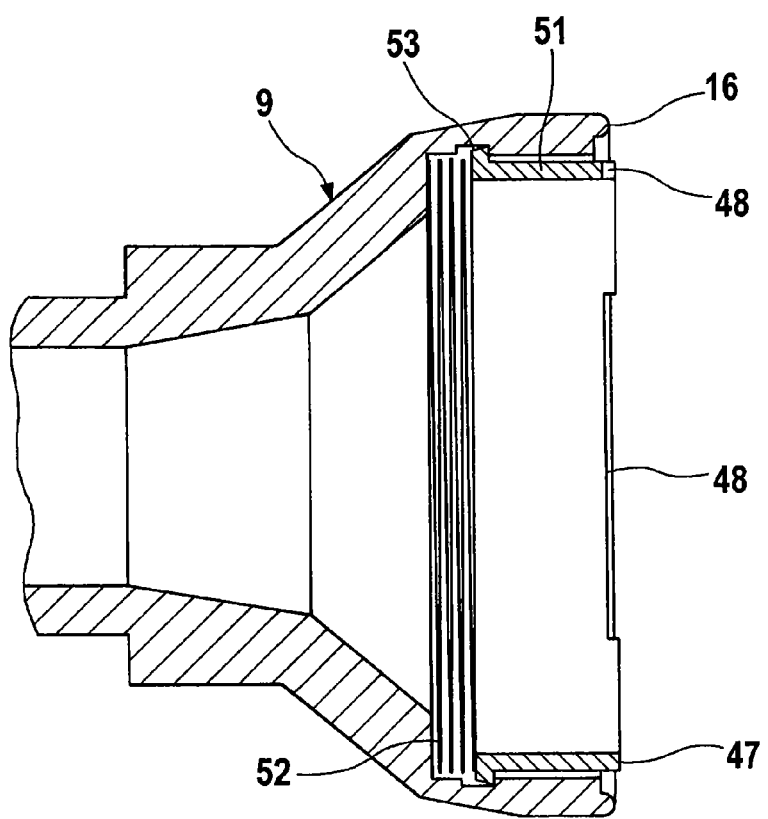
FIG. 8 shows a further modification of the valve piston known from FIGS. 5a, 5b, 6 in longitudinal section, having a crown which is guided in an axially movable manner in the valve piston and which incorporates the function of the further sealing seat in the function of the throttle element.

FIG. 8 shows, in longitudinal section, a further modification of the further sealing seat 47 known from FIGS. 5a, 5b, 6, which further sealing seat 47, like in FIG. 7, is arranged separately on the valve piston 9, and which further sealing seat 47 has a crown 51 which is guided in an axially movable manner in the valve piston 9 and takes over the function of the further sealing seat 47 in order to perform the throttle function. Snap-in hooks 53 on the circumference of the crown 51 serve as a retention facility for the crown 51, which snap-in hooks 53 engage into an annular groove of the valve piston 9. The annular groove is positioned in the valve piston 9 in such a way that a complete stroke of the crown 51 is ensured. In the brake release position, the crown 51 is situated sunk into the valve piston 9 counter to the action of a spring 52 arranged between the crown 51 and the valve piston 9. Only when the valve piston 9 is actuated does the crown 51 lag behind and open up a defined throttled opening cross section for the air flow. With regard to the second sealing seat 16, the explanations given above with regard to the previous exemplary embodiments apply unchanged.

In all the exemplary embodiments which can be seen from FIGS. 2-8, therefore, in each case the further concentric sealing seat 47 acts, so to speak, as a pilot valve with a reduced cross section for throttling the introduced air volume flow, resulting in fine controllability in the lower pressure range and improved noise characteristics.

The invention claimed is:

1. A brake servo for motor vehicles comprising:
   a servo housing, an interior space of which is divided by a movable wall into a vacuum chamber and a working chamber,
   a control housing which bears the movable wall and in which is arranged a control valve which controls a pneumatic pressure difference acting on the movable wall and which can be actuated both by an actuating rod via a valve piston and also, independently of the actuating rod, by an electromagnet,
   three sealing seats arranged concentrically with respect to one another and of a valve body which interacts with the sealing seats, wherein a first sealing seat is formed in the control housing and a second sealing seat is formed on the valve piston, and a third sealing seat is formed on a sleeve which interacts with the electromagnet,
   an annular element which is arranged so as to be movable relative to the third sealing seat and which is arranged radially within the sleeve, and wherein the valve piston has a further concentric sealing seat which projects axially beyond the second sealing seat, with the further sealing seat having at least one recess.

2. Brake servo according to claim 1, wherein a plurality of recesses are provided so as to be distributed uniformly over a circumference of the further sealing seat.

3. Brake servo according to claim 1, wherein the second sealing seat projects axially beyond a region of the recess.

4. Brake servo according to claim 1, wherein the further sealing seat is a constituent part of a throttle element which is connected to an insert part.

5. Brake servo according to claim 4, wherein the insert part is produced from steel.

6. Brake servo according to claim 4, wherein the insert part is fixed in the cavity of the valve piston by an interference fit.

7. Brake servo according to claim 4, wherein the throttle element is produced by extrusion coating of the insert part with an elastomer.

8. Brake servo according to claim 1, wherein the further sealing seat is formed as a sealing lip which is interrupted by a plurality of recesses.

9. Brake servo according to claim 1, wherein the further sealing seat has the contour of a crown which is held in an axially movable manner in the valve piston.

10. Brake servo according to claim 9, wherein the crown has a retention facility, for which purpose snap-in hooks are arranged on the crown, which snap-in hooks engage into an annular groove of the valve piston.

11. Brake servo according to claim 9, wherein, for basic positioning of the further sealing element on the valve piston, a spring is provided which is arranged in a cavity of the valve piston between the crown and an inner shoulder of the valve piston.

12. Brake servo according to claim 11, wherein the spring is a corrugated spring.

* * * * *

UNITED STATES PATENT AND TRADEMARK OFFICE
CERTIFICATE OF CORRECTION

PATENT NO. : 8,561,520 B2  Page 1 of 1
APPLICATION NO. : 12/743430
DATED : October 22, 2013
INVENTOR(S) : Ickler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this
Fifteenth Day of September, 2015

Michelle K. Lee
*Director of the United States Patent and Trademark Office*